No. 845,150. PATENTED FEB. 26, 1907.
J. C. WANDS.
SHOCK ABSORBING DEVICE.
APPLICATION FILED NOV. 24, 1906.

Witnesses
A. J. McCauley
Nellie L. Church

Inventor:
John C. Wands
by Bakewell Cornwall
Att'ys.

UNITED STATES PATENT OFFICE.

JOHN C. WANDS, OF ST. LOUIS, MISSOURI.

SHOCK-ABSORBING DEVICE.

No. 845,150.  Specification of Letters Patent.  Patented Feb. 26, 1907.

Application filed November 24, 1906. Serial No. 344,850.

*To all whom it may concern:*

Be it known that I, JOHN C. WANDS, a citizen of the United States, residing at St. Louis, Missouri, have invented a certain new and useful Improvement in Shock-Absorbing Devices, of which the following is a full, clear, and exact description, such as will enable others skilled in the art to which it appertains to make and use the same, reference being had to the accompanying drawings, forming part of this specification, in which—

Figure 1:
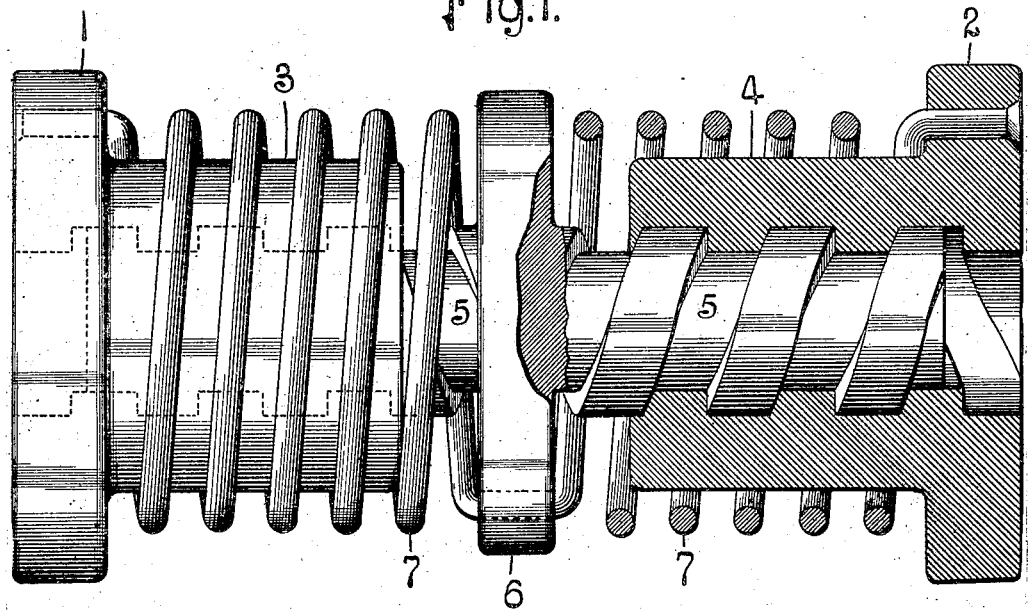
Figure 3:
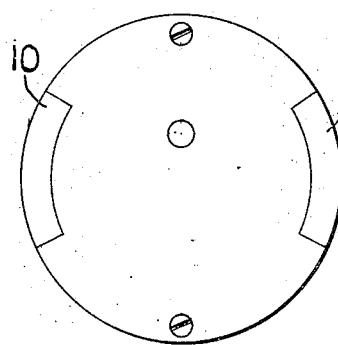
Figure 2:
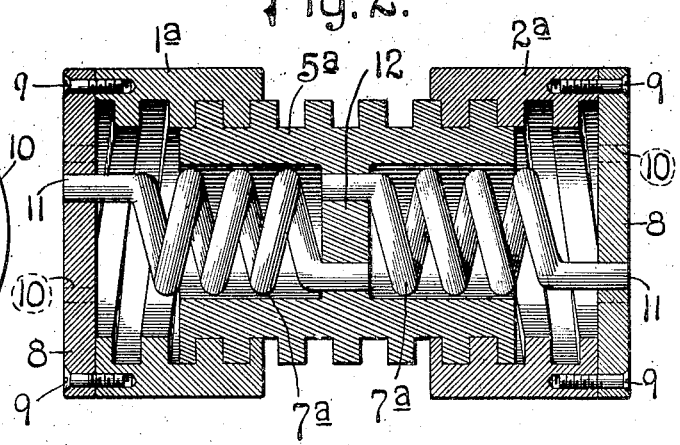

Figure 1 is a longitudinal view, partly in section, of my improved shock-absorbing device. Fig. 2 is a longitudinal sectional view of a modified form of my invention, and Fig. 3 is an end view of the device shown in Fig. 2.

This invention relates to a new and useful improvement in shock-absorbing devices for friction draft-gears, buffers, &c., the object being to so combine the parts having threaded connection with each other and a spring that movement of one of the threaded parts will brace the spring or springs under tension or compression, as the case may be, which supplementing the friction-faces of the threads will absorb shocks or jars.

While I have mentioned that the shock-absorbing devices of my present application may be used for friction draft-gears and in buffers, it is obvious that the device is also useful as a cushioning device for automobiles and wagons and as bolster-supports for car-trucks, &c.

In the drawings, 1 and 2 indicate end pieces or heads, which may be provided with lugs or ears to form seats for the yokes of a car-coupler if the device is used in friction draft-gear, or said heads may have perforated ears or other fastening devices for engagement with a support and the part to be supported.

3 and 4 are inwardly-extending bosses on the heads 1 and 2, respectively, and are arranged in axial alinement with each other. The bosses are provided with interior threads of opposite pitch.

5 indicates a post or central member provided with oppositely-pitched threads, which coöperate with those on the heads 1 and 2, and at approximately the center of said post is a flange 6.

7 is a spring whose ends are connected to the heads 1 and 2 and whose medial portion is provided with a reverse bend fitting in a slot in the centrally-arranged flange on the post. Instead of using a spring made of a single piece, as shown in Fig. 1, it is obvious that two oppositely-coiled springs could be employed. By making the spring of a single piece of material, however, the opposing coils can be formed by a single coiling operation, and the single piece of material possesses the further advantage of simplifying the connection between the ends of the springs of the opposing coils and the post 5.

The right and left hand threaded connection between the post and the head causes the post to rotate when the heads are under load, and this rotation of the post places the oppositely-wound springs under tension or compression, as the case may be. While I have shown torsion-springs arranged so that they will be wound up under load, it is obvious that other forms of springs could be employed, which would act in the same way as the torsion-springs herein shown and assist the friction of the inclined faces of the threads in offering resistance to the movement of the load upon the heads.

In Fig. 2 I have shown a modified form of my invention in which a central member or hollow post $5^a$ is employed, said post being provided with oppositely-pitched threads, with which the oppositely-pitched threads on the heads $1^a$ and $2^a$ coöperate. These heads consist of internally-threaded sleeves having cap-pieces 8 connected thereto by screws 9, and to further prevent relative movement between the cap-pieces and the sleeves the cap-pieces are provided with lugs 10, which enter notches formed in the outer ends of the sleeves. In this form of my invention I use two oppositely-coiled springs $7^a$, provided at their outer ends with extensions 11, which project into openings formed in the cap-pieces of the heads, and at their inner ends with the extensions which project into openings in a web or partition 12, arranged at approximately the middle of the central member or hollow post $5^a$.

Having thus described my invention, what I claim as new, and desire to secure by Letters Patent, is—

1. In a shock-absorbing device, the combination of two head-pieces, having oppositely-pitched, inwardly-extending threaded bosses, a post having its end threaded in opposite directions for engagement with said bosses, and a spring connected to said head-pieces and said post; substantially as described.

2. In a shock-absorbing device, the combination of two head-pieces, having inwardly-extending bosses, said bosses having right and left hand screw-threads respectively, a post having its ends provided with right and left hand screw-threads for engagement with said bosses, and oppositely-coiled springs connected to said head-pieces and said post; substantially as described.

3. In a shock-absorbing device, the combination of two head-pieces having inwardly-extending bosses, said bosses having right and left hand threads respectively, a post having right and left hand screw-threads for engagement with said bosses, and two springs formed by a single piece of material provided with a reverse loop midway its ends, the ends of said piece being connected to said head-pieces and the reversing-loop being connected to said post; substantially as described.

4. A shock-absorbing device comprising a head-piece provided with internal screw-threads, a second head-piece provided with internal screw-threads of an opposite pitch to those on the head-piece first mentioned, a central member provided with screw-threads which coöperate with those on said head-pieces, and coiled springs connected to said central member and head-pieces; substantially as described.

In testimony whereof I hereunto affix my signature, in the presence of two witnesses, this 19th day of November, 1906.

JOHN C. WANDS.

Witnesses:
WELLS L. CHURCH,
GEORGE BAKEWELL.